United States Patent
Bernard et al.

(10) Patent No.: US 7,853,064 B2
(45) Date of Patent: Dec. 14, 2010

(54) METHOD FOR THE PROCESSING OF RADIOLOGICAL IMAGES IN TOMOSYNTHESIS FOR A DETECTION OF RADIOLOGICAL SIGNS

(75) Inventors: Sylvain Bernard, Montigny le Bretonneux (FR); Serge Muller, Guyancourt (FR); Henri Souchay, Versailles (FR); Gero Peters, Paris (FR); Razvan Iordache, Paris (FR)

(73) Assignee: General Electric Company, Schenectady, NY (US)

( * ) Notice: Subject to any disclaimer, the term of this patent is extended or adjusted under 35 U.S.C. 154(b) by 866 days.

(21) Appl. No.: 11/756,471

(22) Filed: May 31, 2007

(65) Prior Publication Data

US 2007/0286470 A1 Dec. 13, 2007

(30) Foreign Application Priority Data

Jun. 7, 2006 (FR) .................................. 06 52043

(51) Int. Cl.
*G06K 9/00* (2006.01)
*A61B 6/00* (2006.01)
*A61B 6/04* (2006.01)

(52) U.S. Cl. ............................. 382/132; 378/4; 378/37

(58) Field of Classification Search ................. 382/128, 382/129, 130, 131, 132, 133, 134, 154; 378/4, 378/8, 21–28, 37, 46, 90, 92, 98.4, 98.6, 378/101, 901; 600/407, 410, 425; 250/390.02; 128/920, 922

See application file for complete search history.

(56) References Cited

U.S. PATENT DOCUMENTS

| 5,930,330 A * | 7/1999 | Wolfe et al. ................. 378/98.2 |
| 7,218,766 B2 * | 5/2007 | Eberhard et al. ............. 382/132 |
| 7,683,338 B2 * | 3/2010 | Ueno et al. ............. 250/370.09 |

FOREIGN PATENT DOCUMENTS

FR 2863749 6/2005

OTHER PUBLICATIONS

Peters G et al, "Reconstruction-independent 3D CAS for calcification detection in digital breast tomosynthesis using fuzzy particles "Progre in pattern recognition, Image Analysis and applications, 10th IberoAmerican Congress on Pattern Recognition, CIARP 2005 (Lecture Notes in Computer Science vol. 3773), Berlin, Germany, 2005, pp. 400-408, ISBN: 3-540-29850-9.

* cited by examiner

*Primary Examiner*—Abolfazl Tabatabai
(74) *Attorney, Agent, or Firm*—Global Patent Operation; Jonathan E. Thomas

(57) ABSTRACT

In an image-processing method for the detection of radiological signs in series of 3D data, an algorithm is used to detect radiological signs in a digital volume according to their contrasts. This algorithm is applied to reconstructed slices or directly to the series of projections. This algorithm is made by means of linear differential filters for signal analysis. It is used to color or enhance the intensity of the detected radiological signals according to the degree of malignancy.

31 Claims, 3 Drawing Sheets

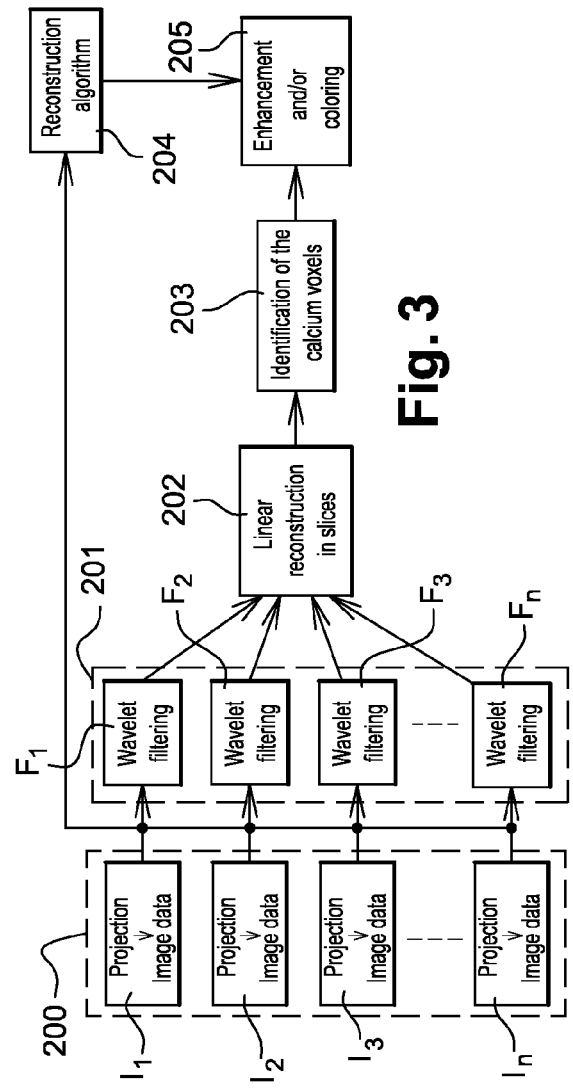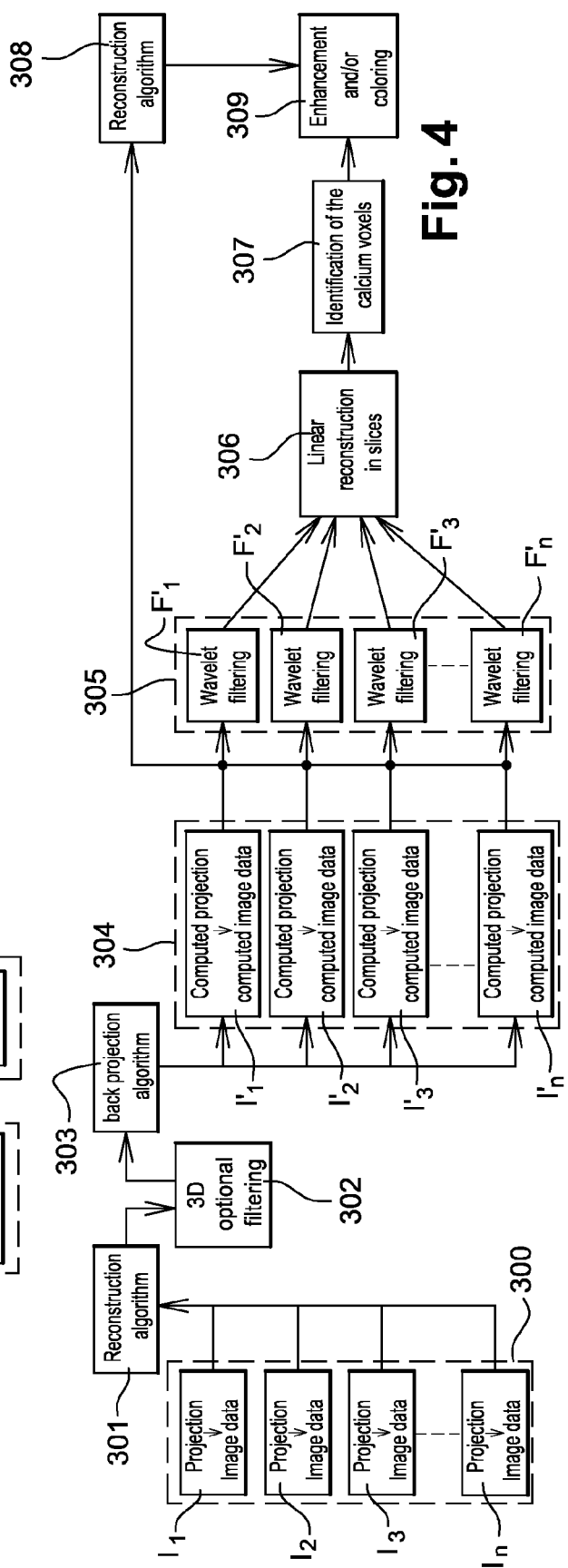

METHOD FOR THE PROCESSING OF RADIOLOGICAL IMAGES IN TOMOSYNTHESIS FOR A DETECTION OF RADIOLOGICAL SIGNS

FIELD OF THE INVENTION

An embodiment of the present invention provides a method for the processing of radiology images for the detection of radiological signs. Embodiments of the present invention can be applied to particular advantage but not exclusively in the field of medical imaging and, more particularly, that of mammography. Embodiments of the present invention also relate to a medical image reviewing station comprising an image-processing method of this kind.

DESCRIPTION OF THE PRIOR ART

Today, mammography is widely used for the detection of lesions and the prevention of breast cancer. The signs to be detected in mammography images are radiological signs associated with lesions. These signs may be either calcium deposits or cases of opacity. Calcium deposits are called microcalcifications and individually form small-sized elements (ranging from 100 µm to 1 mm in diameter) that are more opaque to X-rays than the surrounding tissues. Opacities are dense regions where the X-rays are absorbed more intensely than in the adjacent regions.

It can happen that certain calcium deposits or certain opacities are not spotted by the radiologist. This phenomenon has many causes. In particular, since standard mammography images are the result of projections, they represent superimposed structures that disturb the visibility of the structures of the breast, sometimes leading to a falsely positive interpretation when a superimposition of these structures resembles a lesion or to a falsely negative interpretation when the structures obscure the visibility of a lesion.

To assist in the resolution of these problems of falsely positive or falsely negative interpretation, there are new mammography devices in the prior art that produce a 3D image of the patient's breast. Such a device acquires several projections of an object at different angles then reconstructs the 3D distribution of this object by means of a tomography reconstruction algorithm.

However, this new tomosynthesis mammography device has drawbacks. Indeed, in such devices, a digital volume reconstruction, typically containing 50 to 80 slices, is made for an average breast. Consequently, the quantity of information to be managed is very great. Similarly, access to a piece of information having clinical interest takes much more time since this information is sought sequentially in the volume, slice by slice.

For present-day mammography devices, the frequency of use or the rate of medical acts, especially in breast-cancer screening, is an essential aspect because this frequency comes into play in the economics of the apparatus. However, the new tomosynthesis mammography devices cannot be subjected to high frequency of use because the time of access to information of clinical interest is very great.

Another problem, which is more specific to mammography but can, however, occur in other fields, is related to the necessity of being able to analyze certain radiological signs, which become clinically interesting between 100 µm and 1 mm. Since the resolution of the detector is presently 100 µm, the radiologist has to make rapid searches for smaller objects in large volumes.

SUMMARY OF THE INVENTION

Embodiments of the invention are aimed precisely at overcoming the above-mentioned drawbacks of the prior art. To this end, the invention proposes an image-processing method enabling the automatic detection of the radiological signs in series of 3D data. The time spent to locate these radiological signs is greatly reduced. Hence, the invention can prevent the radiologist from possibly overlooking lesions during the examination. With this image-processing method, the radiological signs are easier to identify and thus enable a more efficient examination.

Embodiments of the invention propose a novel approach to mammography that advantageously exploits the techniques of digital processing of the radiology image to improve the readability of the information.

This image-processing method can be used to cope with a large quantity of the data by developing novel strategies capable of reducing time and simplifying access to information of clinical interest.

One embodiment of the present invention proposes an algorithm for the detection of radiological signs in series of 3D data. The algorithm of the invention is used to indicate the position of the radiological signs on the 3D image by a coloring or enhancement of their intensity and/or, as an option, the marking and/or surrounding of identified clusters of microcalcifications by a contour.

To do this, an embodiment of the invention implements a contrast computation algorithm. This algorithm is applied to reconstructed slices or directly to series of projections. This algorithm is obtained by means of linear differential filters for the analysis of the signal. These linear differential filters are preferably Mexican hat type wavelet filters.

The computed contrast for every voxel is compared to predefined radiological signal contrast conditions. These conditions may be obtained by simulation. When the computed contrast is greater than the maximum of these conditions, then the corresponding radiological signal is validated. Else it is eliminated from the 3D image.

BRIEF DESCRIPTION OF THE DRAWINGS

An embodiment of the invention will be understood more clearly from the following description and the accompanying drawings. These drawings are given by way of an indication and in no way restrict the scope of the invention.

FIG. 3 illustrates means implementing a second embodiment of the method of the invention.

FIG. 4 illustrates means implementing a third embodiment of the method of the invention.

FIG. 3 illustrates means implementing the method of the invention.

DETAILED DESCRIPTION

Figure 1:
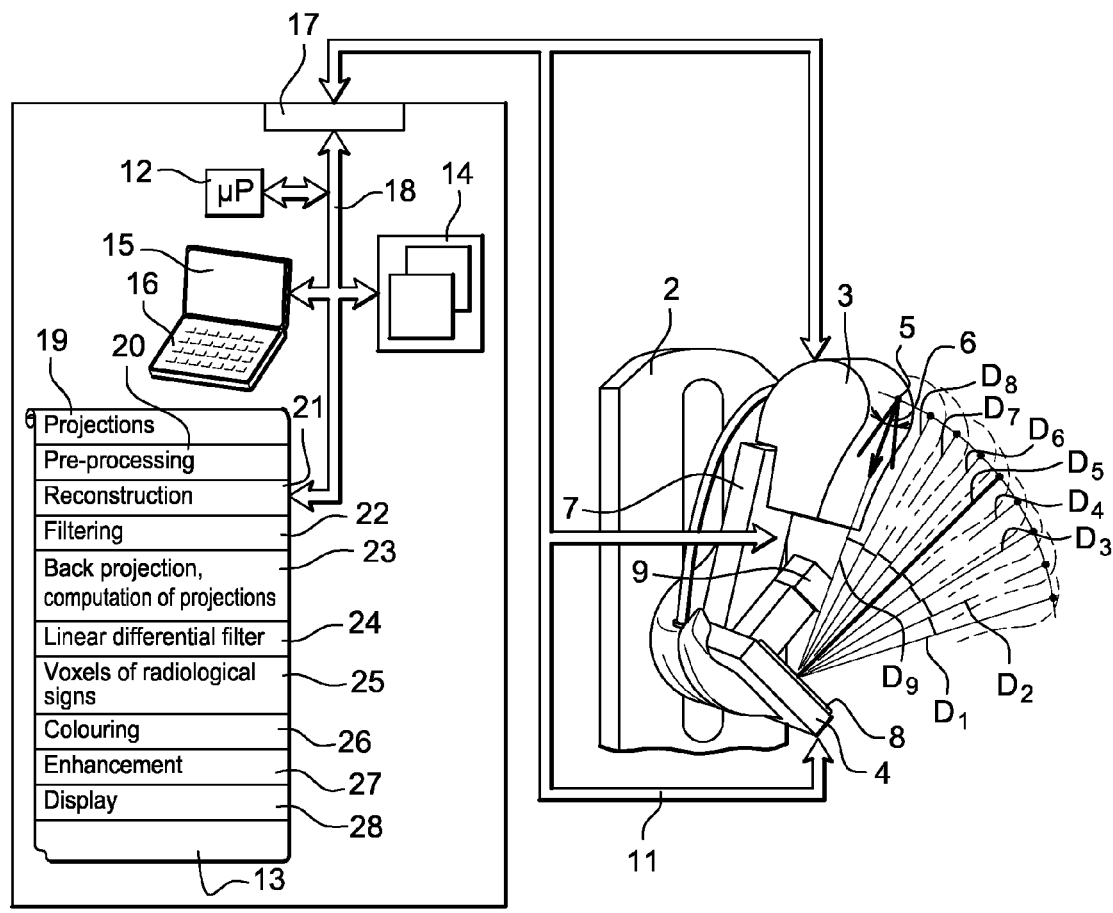
FIG. 1 is a schematic view of an X-ray device, especially a mammography machine, provided with the improved means of the invention.

FIG. 1 shows an X-ray device, especially a mammography machine, according to an embodiment of the invention. This X-ray device 1 has a vertical column 2. On this vertical column, there is a hinged arm 7 bearing an X-ray-emitting tube 3 and a detector 4 capable of detecting the X-rays emitted by the tube 3. This arm 7 may be oriented vertically, horizontally or obliquely. The tube 3 is provided with a focus 5 which is the X-ray emitting focus. This focus 5 emits an X-ray beam 6 along the direction of emission D.

The arm 7 is hinged on the vertical column 2 in such a way that it can be used to shift the tube 3 along a path in the form of a circle arc while at the same time leaving the detector 4 immobile. Other arrangements are possible, enabling the tube to move in a plane or in a sphere portion. The tube 3 can then take up different positions spread in a tilt between two extreme positions. These two positions are, for example, symmetrical to each other relative to the perpendicular to the plane of the detector.

In a preferred example, the detector 4 is a digital detector. The detector 4 is hooked to the arm 7 opposite the tube 3 and in the direction of emission D, so as to receive the X-ray beam 6.

The arm 7 is provided with a breast-holder tray 8 on which a patient lays her breast. This breast-holder tray 8 is placed on top of the detector 4. The detector 4 is placed beneath the breast-holder tray 8. The detector 4 detects the X-rays that have crossed the patient's breast and the breast-holder tray 8.

Furthermore, for reasons related both to the immobilizing of the breast and to image quality or intensity of X-rays delivered to the patient's breast, it is necessary to compress the patient's breast during the radiography. Various compression forces may be applied. These forces are applied through a compression pad 9 which compresses the breast on the breast-holder tray 8 as a function of the type of examination to be made. To this end, the arm 7 has a pad 9 that is a sliding pad capable of being made to compress the breast either manually or in being motor-driven. The pad 9 is made out of an X-ray transparent material, for example plastic. The arm 7 therefore bears the following vertically: starting from the top, the X-ray tube 3, the compression pad 9, the breast-holder tray 8 and the detector 4.

While the pad 9, the patient's breast, the tray 8 and the detector 4 are fixed, the X-ray tube 3 may take up various positions in space relative to this assembly.

In one variant, the detector 4 may be mobile and may take up various positions around the breast at the same time as the X-ray tube 3. In this case, the detector 4 is no longer fixedly joined to the breast-holder tray 8. The detector 4 may be flat or curved. It may be shifted rotationally and/or in translation.

In order to enable the study of each part of the patient's breast, the beam 6 may be oriented in a multitude of directions about the patient's breast. After having received the beam 6 which crosses a part of the patient's body, the detector 3 emits electrical signals corresponding to the energy of the rays received. These electrical signals may then be transmitted to a control logic unit 10 by means of an external bus 11. These electrical signals enable this control logic unit 10 to produce an image corresponding to the part of the body analyzed. These images may be displayed by means of a screen of this control logic unit 10 or printed.

In one example, the control logic unit 10 comprises a microprocessor 12, a program memory 13, a data memory 14, a display screen 15 provided with a keyboard 16 and an output/input interface 17. The microprocessor 12, the program memory 13, the data memory 14, the display screen 15 provided with a keyboard 16 and the input/output interface 17 are interconnected by an internal bus 18.

In practice, when a device is said to have performed an action, this action is performed by a microprocessor of the device controlled by instruction codes recorded in a program memory of the device. The control logic unit 10 is such a device. The control logic unit 10 is often made in integrated-circuit form.

The program memory 13 is divided into several zones, each zone corresponding to instruction codes in order to fulfill a function of the device. Depending on variants of the invention, the memory 13 has a zone 19 having instruction codes to set up a path of the tube 3 and to control a multiplicity of projections along this path. The memory 13 has a zone 20 having instruction codes to carry out a pre-processing of the projected images in order to correct artifacts due to the acquisition geometry and to the detector.

The memory 13 has a zone 21 comprising instruction codes to apply a tomography reconstruction algorithm to all the projection images acquired at different angles, in order to obtain a reconstructed digital volume comprising 50 to 80 slices for an average breast. This zone 21 also has instruction codes for the application to all the acquired projection images of a second reconstructed algorithm that is oriented to a greater extent toward a display objective such as the algebraic reconstruction technique.

The memory 13 has a zone 22 comprising instruction codes to apply a filter to the reconstructed volume in order to reduce the noise. The memory 13 has a zone 23 comprising instruction codes to execute a back-projection algorithm for the reconstructed digital volume. This back-projection algorithm is used to compute projections from the reconstructed digital volume.

The memory 13 has a zone 24 comprising instruction codes to determine a linear differential filter to be applied to each reconstructed slice or to each acquired or computed projection, as a function of the different embodiments of the invention. This zone 24 also has instruction codes to determine the number and the values of the scale parameter of the linear differential filter enabling the range of possible sizes of the radiological signs to be covered. This zone 24 also has instruction codes to perform a convolution of the linear differential filter with each reconstructed slice or each acquired or computed projection. This convolution enables the computation of a contrast at every voxel for each value of the scale of the linear differential filter.

The memory 13 comprises a zone 25 comprising instruction codes to verify that the contrast computed for each voxel of the digital volume complies with predefined contrast threshold conditions, a voxel being an element of the digital volume.

These predefined contrast threshold conditions depend on the intensity of the background, the scale parameter of the filter and the noise level. This zone 25 eliminates all the voxels whose contrast does not comply with these threshold contrast conditions in assigning them a non-radiological-sign voxel attribute. This zone 25 assigns a radiological sign voxel attribute to all the voxels complying with the contrast threshold conditions. An attribute is a temporary and internal parameter of the control logic unit. In one example, the attribute may be a graphic annotation or a binary number.

The zone 25 also has instruction codes to implement an application of directional filters to the digital volume in order to augment the contrast of the elongated structures of said volume.

The zone 25 has codes to perform a thresholding operation dependent on the level of local noise on the volume processed by the directional filters or else on the volume processed by the linear differential filters in order to determine the potential fiber voxels. The zone 25 comprises instruction codes to determine sets of connected potential fiber voxels and measure their elongation. This measurement is compared with a predefined threshold in order to eliminate false positives formed by fibers. To carry out this elimination when the elongation of the set of connected pixels is greater than the predefined threshold, the zone 25 assigns the non-radiological-sign voxel attribute to each voxel of the set of connected voxels. The memory 13 has a zone 26 comprising instructions codes to color the voxels having a radiological sign pixel attribute in assigning them a piece of color information in the digital presentation volume. The memory 13 has a zone 27 comprising instruction codes to enhance the signals of the voxels having a radiological sign pixel attribute in the presentation digital volume. The memory 13 has a zone 28 comprising instructions codes to display the presentation volume comprising the enhanced or colored radiological signs, on the display screen 15.

In operating mode, the control logic unit 10 proceeds by sampling a series of exposures of the tube 3. The breast and hence the detector are thus irradiated during consecutive exposures. For these exposures, the focus of the x-ray tube occupies positions that may be fixed and angularly distributed. In one example, and although this may not be taken to be a limitation of the invention, it is planned that the angular exploration will thus be equal to 60 degrees, plus or minus 30 degrees relative to a median direction of irradiation, generally perpendicular for a mammography apparatus During this exploration, a certain number of beams 6 is emitted, for example 9, 11, 13 or other numbers of beams depending on the desired precision. In the example of FIG. 1, the number of beams D1 to D9 is 9. Thus all the beams 6 are acquired in a single scan. Each beam 6 represents a radiography projection.

Figure 2:
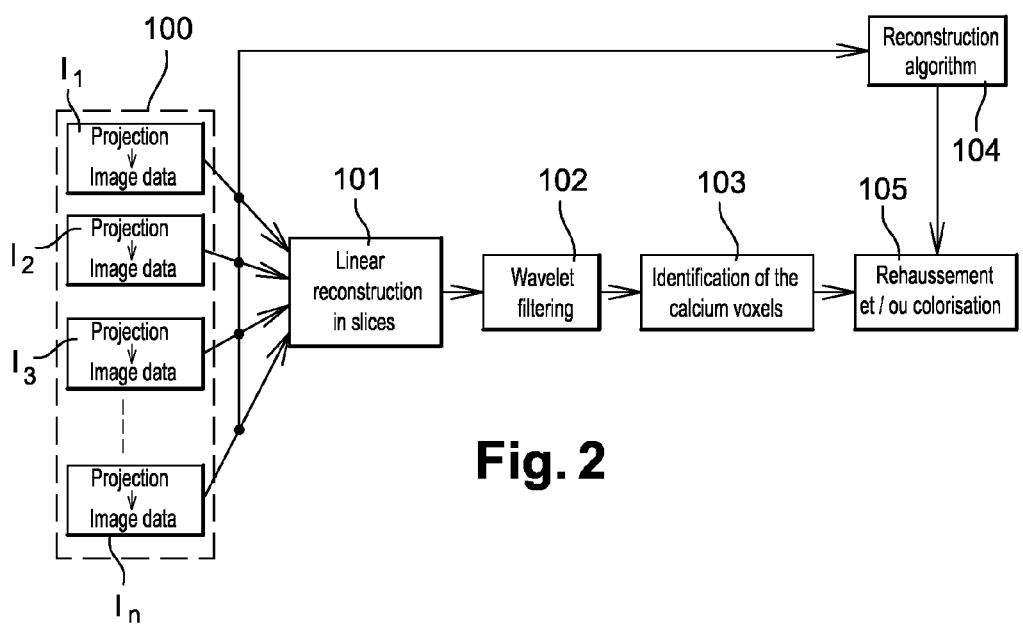
FIG. 2 illustrates means implementing a first embodiment of the method of the invention.

FIGS. 2, 3 and 4 are different illustrations of means implementing the image-processing method provided by an embodiment of the invention. These means are used to locate elements that could constitute radiological signs in the volume of the reconstructed breast. These radiological signs may be microcalcifications or opacities.

FIG. 2 shows a first embodiment of the invention. In FIG. 2, the X-ray tube 3, in the step 100, emits x-ray intensities going through the patient's breast for a multiplicity of projections P1 to Pn, in a pre-determined path. The detector 4 acquires the pieces of x-ray image data I1 to In respectively representing the projection images P1 to Pn. The control logic unit processes the pieces of x-ray image data I1 to In.

At the step 101, the control logic unit applies a simple back-projection reconstruction algorithm. This algorithm is used to rebuild the volume in different slice planes parallel to the detector. The term used here is tomosynthesis of the breast. All the pieces of image data I1 to In are used during this tomosynthesis reconstruction to provide a digital volume of the breast. This tomosynthesis technique enables the reconstruction of the 3D volume of the breast being studied from a small number of 2D projections or pieces of image data, distributed on a restricted angular domain and acquired on a digital detector.

At the step 102, the control logic determines a means of computation of the contrast, in each slice of the voxels of the digital volume. These contrast computation means are formed by a linear differential filtering operation designed to react strongly to the presence of structures having a given dimension. To implement said means, the control logic unit applies a binary mask to each slice in order to separate the breast tissue from the background and perform computations of contrast only on the voxels of the breast tissue. This binary mask applied to the slices may be obtained from a separation between the breast tissue and the background performed on the projection images.

Figure 5A:
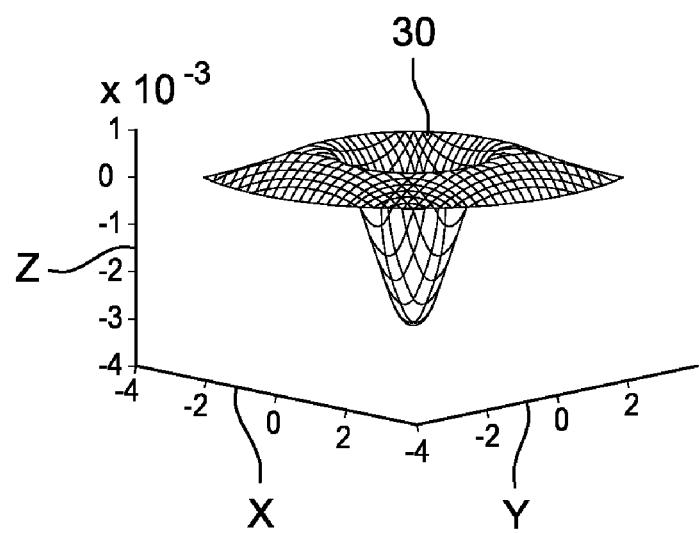
FIG. 5a is a schematic view of a Mexican-hat type wavelet filter according to the invention.
Figure 5B:
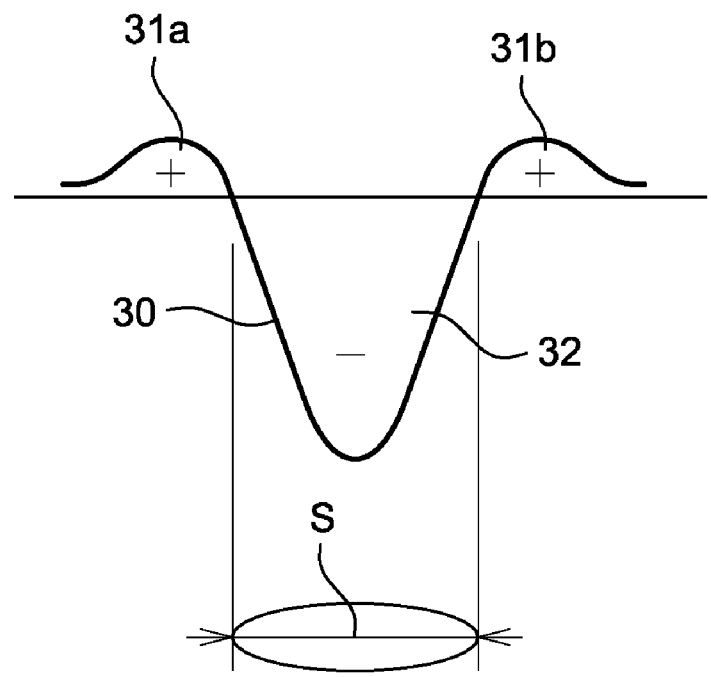
FIG. 5b is a schematic view of a section in the plane (X, Z) of the wavelet filter of FIG. 5a, according to the invention.

A mode of computation of the contrast of the voxels is shown in FIGS. 5a and 5b. The control logic unit preferably computes the contrast of each voxel by means of a Mexican hat type of wavelet filter, with a scale parameter s. It is understood that this wavelet filter described in FIGS. 5a and 5b may be replaced by other types of linear differential filters used to compute a contrast of all the voxels of the digital volume.

The control logic unit determines the number and the values of the scale parameter of each wavelet filter. The number and the values of the scale must be sufficient to cover the range of the sizes of the radiological signs. In the example of the invention, the control logic determines two scales having values $s=\sqrt{2}$ and $s=2$.

The control logic unit performs a convolution of each reconstructed slice with the wavelet filter, as described in FIG. 5a for each value of the scale.

The theoretical contrast $\Delta I$ of a spherical radiological sign with a radius s, measured by the wavelet of scale parameter s at the center of the sphere and in the slice passing through the center of the microcalcification, is $\Delta I = I_b \cdot s \cdot \Delta \mu \cdot K$ where K is a constant, Ib is the background intensity and $\Delta \mu$ is the difference between the coefficients of attenuation of the composition of the breast tissue and of the composition of the radiological sign. The background intensity $I_b$ is measured in the slice as the mean of the gray levels weighted by the coefficients present in the positive part of the wavelet coefficients and s is also the scale parameter of the wavelet filter.

$\Delta \mu$ depends on the composition of the breast, the composition of the radiological sign and the intensity of the X-rays. It is difficult to predict $\Delta \mu$ since the composition of the breast and the exact composition of the radiological sign are unknown. Consequently, the control logic unit sets a lower boundary $\Delta \mu_{min}$ for the radiological signs. This lower boundary is obtained by simulation.

At the step 103, the control logic unit applies an algorithm for the validation of the presumed radiological sign voxels to reconstructed slices of the filtered digital volume. For each reconstructed slice of the digital volume, which may be 50 to 80 for an average breast, the control logic unit assigns a radiological sign voxel attribute or non-radiological-sign voxel attribute to each voxel.

The control logic ascertains that the measured contrast of each voxel is sufficient to be considered as a radiological sign pixel, depending on the size of the radiological sign, the intensity of the background and the noise level. If the contrast is not greater than an attenuation of a radiological sign having a radius s or if the probability that this contrast comes from the noise is too great, then the pixel is not considered to be a radiological sign voxel.

To do this, the control logic unit compares the contrast of each voxel with a first pre-determined condition of radiological sign contrast threshold.

The control logic assigns a radiological sign pixel attribute only to the voxels whose contrast meets this first contrast threshold condition.

First condition: the contrast $\Delta I > I_b \cdot s \cdot \alpha$.

If the measured contrast is greater than a contrast $\alpha$ multiplied by the background intensity $I_b$ and by the scale parameter s of the filter, then the control logic unit assumes that the corresponding voxel is a potential radiological sign voxel and assigns it a radiological sign voxel attribute. If not, the control logic unit assigns the corresponding voxel a non-radiological-sign voxel attribute. The background intensity $I_b$ is given at every point by the convolution of the raw image with the coefficients of the positive parts of the wavelet filter.

However, this first contrast threshold condition is not selective enough, especially in the case of a low noise contrast ratio. This low noise contrast ratio often results in low X-ray intensities during the acquisition of the projections. In this case, the probability that the measured contrast comes from the noise is high. As a consequence, the control logic defines a second contrast threshold condition at the step 109.

This second contrast threshold condition is defined as follows: the contrast of each pixel selected at the step 107 must also be greater than a constant $\beta$ multiplied by the mean standard deviation of the noise. A preferred embodiment takes account only of the quantum noise $\sigma$ which is linearly related to the square root of the background intensity.

Thus, the second contrast threshold condition rejects the candidate pixels whose contrast might come from the quantum noise. This rejection is done with a rejection rate controlled by the parameter $\beta$.

The second contrast threshold condition to be met is that: the measured contrast $\Delta I > \beta \cdot \sigma$ with $$\sigma = \sqrt{I_b} \cdot \sqrt{\iint_{x,y} f_s(x, y)^2 dx dy} \ o$$

where the $f_s(x, y)$ are the coefficients of the wavelet filter.

However, it can be seen that, in reality, the quantum noise is also altered by a modulation transfer function (MTF) of the detector. This modulation transfer function is preferably known beforehand. In one variant, it can be computed according to prior art computation modes. Thus, to improve the second contrast threshold condition, the control logic unit can incorporate measurements of modulation transfer function in the algorithm of the invention. Furthermore, in addition to the quantum noise, there is the electronic noise of the detector.

When the contrast of the candidate voxel is greater than the first contrast threshold condition and the second contrast threshold condition, then the control logic unit assumes that the corresponding voxel is the radiological sign voxel and keeps its radiological sign voxel. Else, the control logic unit considers the corresponding voxel to be noise and assigns it the non-radiological-sign voxel.

Finally, a voxel is chosen as being the radiological sign voxel if, for one of the two scales $s=\sqrt{2}$ or $s=2$, the measured contrast of this voxel complies with the two predefined contrast threshold conditions. These two contrast threshold conditions may be combined in a single third contrast threshold condition. In this case, the combination of the first and second contrast threshold conditions is expressed as follows: the measured contrast $\Delta I > \max(I_b \cdot s \cdot \alpha, \beta \cdot \sigma)$ where $\alpha$ and $\beta$ are the parameters of the algorithm.

However, structures of the reconstructed volume may have characteristics similar to the characteristics of radiological signs. To eliminate these structures forming false positives in the volume, the control logic unit applies firstly an adequate linear filter to said volume. These linear filters are determined as a function of a given radiological sign characteristic. These characteristics may be for example size and shape. In one example, these linear filters can enhance structures of a given size. Furthermore, the control logic unit applies a set of morphological, densitometry and/or textural criteria to said structures in order to differentiate them from the radiological signs.

In one example of the invention, these structures are illustrated by fibers, it being known that they can also be illustrated by any other type of structure that does not constitute a radiological sign. In the reconstructed volume, some fibers may have good properties of attenuation and a diameter similar to that of the radiological signs. This leads to a large number of false positives formed by the fibers in the digital volume. Here, therefore, shape is the most important characteristic used to distinguish the radiological signs from the fibers because the fibers have a highly elongated shape unlike the radiological signs.

To do this, the control logic unit can eliminate the majority of the false positives formed by the fibers in using the coefficients of the Mexican hat type wavelets described here above. This leads to an algorithm that is fast but less selective than an algorithm using directional filters.

The control logic unit performs a thresholding operation, dependent on the local noise level, on the image filtered by the Mexican hat type wavelets in order to determine the voxels of potential fibers. Voxels of potential fibers are selected if, for one of the two scales considered: $s=\sqrt{2}$ and $s=2$ the contrast of the pixel is greater than a predefined fiber threshold. This fiber threshold is equal to $\beta_{fibre} \cdot \sigma$ where $\beta_{fiber}$ is a parameter of the algorithm.

In one variant, the control logic unit may apply directional filters to each slice of the reconstructed digital volume given by the step 101 to augment the signal of the fibers. In a preferred embodiment, these directional filters are $\beta$-spline wavelet type functions. These functions are described in the document FR28 63 749. These wavelet filters have different scales and orientations. For each voxel, the control logic unit determines the wavelet filter that gives the best response. The best filter gives the orientation of the fiber in the neighborhood of the pixel as well as a directional filtered digital volume. A threshold is then applied to the directional filtered volume in order to determine the pixels of potential fibers. For a voxel(i,j) of a given slice, this threshold is equal to $\beta_{fibre} \cdot \sigma'$ with $$\sigma' = \sqrt{M(i, j)} \cdot \sqrt{\iint_{x,y} g_{max}(x, y)^2 dx dy}$$

where $M(i,j)$ is the average of the gray level in the slice reconstructed at the step 101 and in the neighborhood of the point $(i,j)$. $g_{max}(x,y)$ are coefficients of the $\beta$-spline wavelet locally giving the best response and N is the number of projections that have served in the reconstruction of the voxel $(i,j)$.

In one variant, the application of a directional filter to each of the slices of the digital volume is obtained by applying this directional filter to each piece of image data I1 to In and then applying the reconstruction algorithm of the step 101. Similarly, the mean $M(i,j)$ about each point $(i,j)$ of a given slice may be obtained by locally taking the meaning of each piece of image data I1 to In and then applying the reconstruction algorithm of the step 101. This method leads to a faster algorithm for the elimination of fibers because its complexity depends only on the number of projections and not on the number of slices.

The control logic unit creates a binary volume in which all the voxels are placed at 0 except the voxels of potential fibers which are placed at 1. To extract the voxels of fibers from among the voxels placed at 1, the control logic unit applies a 2D or 3D connected-component algorithm that extracts particles formed by a set of connected points set at 1.

The control logic unit determines the morphology of each connected set of voxels forming particles. A major shape characteristic may be given by the greatest Feret number that provides information on the length of the particles. The Feret numbers measure the elongation of the particle along a set of directions sampling the totality of the possible directions.

The control logic unit determines a Feret threshold $I_{Feret}$. This threshold $I_{Feret}$ is preferably obtained by simulation. When the elongation of the particle measured is greater than the threshold $I_{Feret}$, then the control logic unit considers this particle to be a fiber and the attribute of the non-radiological-sign fiber is assigned to each of its voxels.

Thus, the algorithm of the invention has four parameters $\alpha$, $\beta$, $\beta_{fiber}$ and $I_{Feret}$ which are determined by simulation on a truth database.

At the step 104, the control logic unit applies a reconstruction algorithm on the basis of the pieces of image data I1 to In. This reconstruction algorithm is an algorithm more oriented toward a display objective, such as the algebraic reconstruction technique. It gives a presentation volume.

At the step 105, the control logic unit applies an algorithm for displaying the radiological sign pixels at the presentation volume obtained in the step 104 in order to facilitate the practitioner's analysis. This display algorithm may apply a process of enhancement of the intensity of the voxels having a radiological sign voxel attribute or can assign a piece of color information to them as well as to their immediate environment.

The first step of the enhancement process consists in applying a 3D connected-component algorithm to a binary volume formed by voxels at 1 for radiological sign positions and at 0 elsewhere. This leads to a set of 3D particles of radiological sign. Then, for each voxel of the presentation image S belonging to a particle P (and its surrounding), the voxel intensity is increased relative to the intensity of the immediate surroundings or environment of the particle.

The immediate environment of the particles is defined as a set of voxels located at a distance smaller than a distance D from the voxels of the particles. This distance D is a preliminarily defined parameter. The control logic unit computes the mean of the gray level $M_p$ in the immediate environment of the particle. This mean of the gray level $M_p$ is the background intensity of the particle. For each voxel (i,j,k) of the particle and its immediate environment, the enhanced image referenced DCA(i,j) is obtained by amplifying the difference between the intensity S(i,j) of the pixel of the particle and the background intensity $M_p$ of the particle according to the following equation:

$$DCA(i, j, k) = M_P + \left(1 + A \cdot e^{-\frac{d^2}{\tau^2}}\right) \cdot [S(i, j, k) - M_P]$$

where A directly influences the enhancing power and d is the distance between the pixel (i,j,k) and the particle with d=0 for each pixel inside the particle. Since it is difficult to identify radiological sign sections, the control logic unit applies an enhancement whose strength diminishes with distance from the particle. The parameter $\tau$ controls this reduction of the enhancement factor with distance. It is also possible optionally to integrate clinical information into the enhancement process by using an enhancement factor that depends on this information.

In one example, the control logic unit integrates a piece of cluster-type clinical information into the enhancement process. The clusters of microcalcifications are obtained by a microcalcification clustering algorithm. The enhancement of each pixel belonging to the particle as well as its immediate surroundings or environment defined earlier is given by the following equation:

$$DCA(i, j, k) = M_P + C \cdot \left(1 + A \cdot e^{-\frac{d^2}{\tau^2}}\right) \cdot [S(i, j, k) - M_P]$$

where C depends on the number of microcalcifications in the cluster. In one example, the clusters are indicated in the presentation volume by markers created by the logic control unit. These markers may be a graphic annotations located at the center of gravity of the clusters.

In one variant, the logic control unit can plot a contour around the clusters having more than a given minimum number of microcalcifications. This may be of interest if the practitioner's attention needs to be directed more specifically to its calcium content.

Should the display of the results be done by coloring the voxels of radiological signs, a color is assigned to them as a function of the quantity $S(i,j,k)-M_p$, the distance d and optionally the number of microcalcifications in the cluster as well as the cluster number.

The final presentation volume on which the particles of radiological signs have been enhanced or colored is displayed on the display screen in order to be viewed by a practitioner. In this final volume, all the radiological signs have been highlighted without distinction as regards their suspect character or as regards their grouped or isolated character. Consequently, the radiologist obtains an immediate overall view of the mapping of the distribution of the radiological signs.

With this embodiment of the invention, to detect and compute the contrasts $\Delta I$ of the voxels of presumed radiological signs, the control logic unit must convolute each slice with the wavelets. This is demanding in terms of computer resources required for computation, even for slices with a one-millimeter spacing.

The invention has thus implemented a second embodiment comprising a faster algorithm that depends only on the number of projections and not on the number of slices in assuming a parallel geometry, as illustrated in FIG. 3.

FIG. 3 shows another illustration of means implementing the method according to an embodiment of the invention. In the implementation of the invention, the image-processing method is applied to each piece of image data I1 to In, respectively representing each projection P1 to Pn obtained at the step 200. These pieces of image data are given directly by the digital detector to the control logic unit. It is on the basis of these pieces of image data that the processing method enables the location of elements likely to form radiological signs. These radiological signs may be microcalcifications or opacities.

At the step 201, the control logic unit respectively applies a binary mask F1 to Fn to each piece of image data I1 to In in order to separate the breast tissue from the background. Then, each piece of image data obtained is converted into a contrast image defined for each pixel identified as a pixel of the breast tissue of each piece of image data. This conversion is obtained by a linear differential filtering which is preferably a Mexican hat type wavelet filtering. This type of filtering is illustrated in FIGS. 5a and 5b.

After having performed separate contrast computations in each of the pieces of image data, the control logic unit performs the step 202. The step 202 consists of a simple back projection of the digital volume from the contrasts of the pixels of each of the pieces of image data. For a value of the scale parameter s, the volume of contrast thus produced is identical to that of the step 102 in assuming a parallel geometry.

At the step 203, the control logic unit determines the voxels liable to be radiological signs as a function of their computed contrast. This step 203 comprises the same radiological sign voxel selection elements as the step 103 of FIG. 2 except for the computation of the intensity of the background $I_b$. It is obtained at every voxel by application of the reconstruction algorithm of the step 202 from image data I1 to In filtered by the positive part of the wavelet coefficients.

The enhancement step 205 is the same as the enhancement step 105 of FIG. 2. Similarly, the reconstruction algorithm step 204 is the same as that of the step 104 of FIG. 2.

The main advantage of this method is then it provides a fast means of computing contrasts and hence of detecting radiological sign voxels with a computation time the depends on the number of projections and not on the number of slices. This is a significant improvement since the number of slices is generally far greater than the number of projections.

FIG. 4 is a third illustration of means implementing the method of the invention. At the step 300, the control logic unit acquires a multiplicity of projections P1 to Pn, in a predetermined path. The detector 4 acquires the pieces of X-ray image I1 to In respectively representing the projections P1 to Pn. The control logic unit processes the pieces of image data I1 to In.

At the step 301, the control logic unit applies an image reconstruction algorithm of the type used in tomosynthesis in order to obtain a digital volume of the breast.

At the step 302, the control logic unit filters the digital volume to reduce the impact of the noise and increase the contrast. This step 302 depends essentially on the acquisition device and may therefore change between the different versions of existing acquisition devices.

In one variant, the control logic unit may skip the step 302 for filtering the digital volume and pass directly to the step 303

At the step 303, the control logic unit applies a back-projection algorithm to the reconstructed digital volume. At the step 304, this back-projection algorithm gives pieces of image data computed by back projection I'1 to I'n.

This back projection is possible because of prior knowledge of the acquisition geometry.

At the step 305, the control logic unit respectively applies a binary mask F'1 to F'n to each piece of back-projected image data I'1 to I'n in order to separate the breast tissue from the background. Then, each piece of the back-projected image data I'1 to I'n obtained is converted into an image of contrasts defined for each pixel of each piece of image data.

The steps 305 to 309 of FIG. 4 are respectively described in the steps 201 to 205 of FIG. 3.

FIG. 5a shows a 3D schematic view of a wavelet filter with a scale parameter s. Wavelet filtering is a method used to analyze the content of image data or slices. In a preferred embodiment, the wavelet filtering is of an inverted Mexican hat type. The scale parameter of the wavelet filter is very similar to the notion of scale for geographical maps. As in the case of the maps, the big scale values correspond to non-detailed overall views. The small scale values correspond to detailed views. In terms of frequency, similarly, the low frequencies or big scales give overall information on the signal usually throughout the extent of the signal whereas the high frequencies or small scales give detailed information on the smaller patterns in the signal.

The wavelet filter is represented, in the example of FIG. 2, on the X, Y and Z Cartesian coordinates. The wavelet filter is translated to the plane defined by the X and Y axes. The Z axis represents the amplitude of the wavelet filter.

Wavelet filtering is particularly well suited to local and multiple-scale analysis in medical imaging, especially mammography. The control logic unit defines a family of wavelet filters to be applied to each projection or slice in order to compute the contrast for each predefined size of radiological sign. The logic control unit arbitrarily chooses the scale depending on the predefined size of radiological sign. Thus, the scale parameter of the filter depends on the sign of the radiological signal sought.

In the invention, to compute the contrast of each pixel or voxel for all the possible sizes of radiological signs, the control logic unit defines the number and the values of the scale parameter s.

In a preferred embodiment, the control logic unit defines two scale parameters and the value of each scale parameter. These values are determined as a function of the range of the sizes of radiological signs to be detected. In one example, the control logic unit seeks to detect the radiological signs belonging to the range sized 100 µm to 500 µm because, beyond this value, the radiological signs are sufficiently visible to the radiologist.

In this case, since the resolution of the detector is 100 µm, the range of the sizes is covered with two scale parameter values. The value of the first scale parameter s=s1 is equal to $\sqrt{2}$ and the value of the second scale parameter s=s2 is equal to 2.

In one variant, the number and the values of the scale parameter may be different from those mentioned here above. This number and these values of the scale parameter defining the family of the wavelet filters may be changed as a function of the sizes of the radiological signs to be detected.

FIG. 5b shows a section view in the plane (X, Z) of the wavelet figure of FIG. 5a according to the scale s1 or s2. Each wavelet filter defined by the control logic unit measures the contrast of each pixel or voxel, as a function of the scale parameter s1 or s2. The wavelet filter 30 is a local filter. It has two positive parts 31a and 31b and one negative part 32. The two positive parts 31a and 31b are situated on either side of the negative part 32. The two positive parts 31a and 31b form the brim of the Mexican hat and the negative part forms the crown of the Mexican hat. The greatest radius of the negative part is equal to the value of the scale of the filter.

The equation of the computation of the contrast of each pixel or voxel is given in polar coordinates by the following equation where r is the radius variable:

$$f_s(r) = -\left(1 - \frac{r^2}{s^2}\right) \cdot e^{-\frac{r^2}{s^2}}$$

where s is the scale of the filter, s being equal to s1 or s2. The control logic unit performs a convolution of the piece of image data or of the section with a first wavelet filter having a scale s=s1 and then a second wavelet filter with a scale s=s2, in order to extract the pixels or voxels whose contrast, for at least one of the scales, is greater then a constant multiplied by the scale s multiplied by the intensity of the background. This approach with several graduations makes it possible to adapt to the variations planned in the size of the radiological signs, in medical imagery.

During the convolution of the piece of image data or of the section with the wavelet, the control logic unit computes, at each piece of image data or voxel having coordinates (x, y, z)

of the section, a mean of the gray levels neighboring (x, y) weighted by the absolute value of the negative coefficients of the filter and a mean of the gray levels neighboring (x, y) weighted by the positive coefficients of the filter. The mean of the gray levels present in the negative part represents the mean of the gray levels of the part presumed to be a radiological sign part. The means of the gray levels present in the positive part represents the mean of the gray levels of the part of the background surrounding the presumed radiological sign.

Finally, the control logic unit computes the contrast of said pixel in taking the difference between these two average values. The use of the wavelet filter enables a computation of linear contrast in taking a difference between the mean values of gray level. This type of computation of contrast is more robust to noise than a difference between a gray level value at the pixel (x, y) or at the voxel (x, y, z) and the signal of a neighboring pixel or voxel. Furthermore, with this type of computation of the contrast, it is possible to foresee the impact of the wavelet filters on the noise level.

After having computed the contrast, the control logic unit determines the voxels meeting the conditions of radiological signs as described in FIGS. 2, 3 and 4.

In general, the control logic unit may consider a model of radiological sign with different shapes and noises different from the quantum noise. Thus, the control logic unit may use different assumptions as inputs for different types of processing.

What is claimed is:

1. A method for the processing of images of an X-ray device, comprising:
    making several radiographic projections of a body;
    reconstructing a digital volume in slices of the body from all the projections;
    locating in this digital volume, structures representing radiological signs;
wherein:
    computing at least one contrast for each voxel of the digital volume;
    making a preliminary definition of at least one contrast threshold corresponding to radiological signs;
    when the computed contrast is greater than the contrast threshold, assigning a radiological sign voxel attribute to the corresponding voxel;
    displaying the voxels provided with a radiological sign voxel attribute in a digital presentation volume produced from the projections; and
    assigning, by way of presentation, a piece of color information to the voxels having a radiological sign voxel attribute, as well as to their immediate environment, in the presentation digital volume.

2. A method according to claim 1, further comprising:
    identifying a set of voxels of structures forming false positives because they have characteristics close to radiological signal; and
    assigning the set of these voxels of structures a non-radiological-sign voxel attribute as a function of morphological, densitometry and/or textural criteria.

3. The method of claim 1, further comprising:
    displaying the presentation digital volume with the voxels colored.

4. A method according to claim 1, wherein the step of computing the contrast of each voxel comprises the following steps:
    computing the coefficients of a linear differential filter having a scale parameter (s) to be applied to each slice of the digital volume;
    characterizing a scale parameter by a size of radiological signs to be analyzed,
    determining a sufficient number of scales to cover a range of sizes of the radiological signs; and
    performing a convolution of each slice with the linear differential filter, for each scale value.

5. A method according to claim 4, wherein the linear differential filter is a Mexican-hat type of wavelet filter, comprising a central part formed by negative coefficients and a positive part located at the periphery, the greatest radius of the negative part being equal to the value of the scale of the filter.

6. A method according to claim 1, wherein the step of computing the contrast of each voxel comprises the following steps:
    determining a linear differential filter having a scale parameter (s) to be applied to each projection;
    determining a sufficient number of scales to cover a range of sizes of the radiological signs;
    performing a convolution of each projection with the linear differential filter, for each scale values; and
    reconstructing the digital volume of the body from the filtered projections for each scale value.

7. A method according to claim 1, wherein the step of computing the contrast of each voxel comprises the following steps:
    reconstructing the digital volume from the projections;
    filtering the reconstructed digital volume;
    back-projecting the reconstructed digital volume;
    determining a linear differential filter having a scale parameter (s) to be applied to each back-projected projection;
    determining a sufficient number of scales to cover a range of sizes of the radiological signs;
    performing a convolution of each back-projected projection with the differential filter, for each scale value; and
    reconstructing the digital volume of the body from the projections back-projected and filtered for each scale value.

8. A method according to claim 1, wherein the preliminary determining of the contrast threshold comprises the following steps:
    preliminarily defining a first threshold that depends on the local background intensity of the digital volume and the value of scale of the filter;
    providing this background intensity at every point by the convolution of each slice of the digital volume with the coefficients of the positive part of the wavelet filter or else by the convolution of each projection with the coefficients of the positive part of the wavelet filter, then by reconstruction;
    preliminarily defining a second threshold that depends on a local noise level present in the digital volume; and
    making a combination of the first and second thresholds in order to obtain the contrast threshold.

9. A method according to claim 1, wherein the step of eliminating structures forming false positives comprises the following steps:
    determining a set of filtered digital volumes for which the contrast of the structures is amplified;
    pre-defining a structure contrast threshold which depends on the local noise level;
    creating a binary volume in which all the voxels whose contrast is greater than the structure contrast threshold are set at 1 and all the others are set at 0;
    determining particles of potential structures formed by a set of connected voxels;

measuring the elongation of each particle of potential structures;

defining a minimum threshold of elongation; and when the elongation of the particle is greater than the minimum elongation threshold, then assigning the voxels of the particle a non-radiological-sign voxel attribute.

10. A method according to claim 9, wherein the step of obtaining the filtered digital volumes comprises:

determining directional filters to be applied to the digital volume; and convolving each slice with the directional filters.

11. A method according to claim 10, wherein the directional filters are b-spline type wavelet filters having different scales and orientations.

12. A method according to claim 9, wherein the step of obtaining the filtered digital volumes comprises:

determining directional filters to be applied to each projection;

convolving each projection with the directional filters; and reconstructing the filtered digital volume from filtered projections for each directional filter.

13. A method according to claim 9, wherein the step of obtaining the filtered digital volumes comprises one of:

considering the result of the convolution of the volume by the linear differential filters, for each scale value;

or else, for each scale value, considering the reconstructed volume on the basis of the projections convoluted by the linear differential filters.

14. A method according to claim 1, wherein the step of enhancing of the voxels in the digital presentation volume comprises the following steps:

creating a binary image in which all the voxels having a radiological sign voxel attribute are set at 1 and all the others are set at 0;

determining particles formed by a set of connected voxels; and amplifying the difference between the intensity of each voxel of the particle, as well as its immediate environment, and the mean intensity of the voxels surrounding the particle.

15. A method according to claim 14, further comprising:

determining the cluster of particles comprising a minimum number of particles;

amplifying the difference between the intensity of each voxel of the particle, as well that of as its immediate environment, and the mean intensity of the voxels surrounding the particle, as a function of the number of particles present in the cluster; and one of placing a marker in the vicinity of the center of gravity of the cluster or plotting a contour demarcating the cluster.

16. An X-ray device for implementing said radiology image-processing method for a detection of radiological signs according to claim 1.

17. A method for the processing of images of an X-ray device, comprising:

making several radiographic projections of a body;

reconstructing a digital volume in slices of the body from all the projections;

locating in this digital volume, structures representing radiological signs;

wherein:

computing at least one contrast for each voxel of the digital volume;

making a preliminary definition of at least one contrast threshold corresponding to radiological signs;

when the computed contrast is greater than the contrast threshold, assigning a radiological sign voxel attribute to the corresponding voxel;

displaying the voxels provided with a radiological sign voxel attribute in a digital presentation volume produced from the projections; and enhancing the intensity of the voxels having a radiological sign voxel attribute, as well as their immediate environment, in the presentation digital volume.

18. The method of claim 17, further comprising:

displaying the presentation digital volume with the voxels enhanced.

19. A method according to claim 17, wherein the step of computing the contrast of each voxel comprises the following steps:

computing the coefficients of a linear differential filter having a scale parameter (s) to be applied to each slice of the digital volume;

characterizing a scale parameter by a size of radiological signs to be analyzed, determining a sufficient number of scales to cover a range of sizes of the radiological signs; and performing a convolution of each slice with the linear differential filter, for each scale value.

20. A method according to claim 19, wherein the linear differential filter is a Mexican-hat type of wavelet filter, comprising a central part formed by negative coefficients and a positive part located at the periphery, the greatest radius of the negative part being equal to the value of the scale of the filter.

21. A method according to claim 17, wherein the step of computing the contrast of each voxel comprises the following steps:

determining a linear differential filter having a scale parameter (s) to be applied to each projection;

determining a sufficient number of scales to cover a range of sizes of the radiological signs;

performing a convolution of each projection with the linear differential filter, for each scale values; and reconstructing the digital volume of the body from the filtered projections for each scale value.

22. A method according to claim 17, wherein the step of computing the contrast of each voxel comprises the following steps:

reconstructing the digital volume from the projections;

filtering the reconstructed digital volume;

back-projecting the reconstructed digital volume;

determining a linear differential filter having a scale parameter (s) to be applied to each back-projected projection;

determining a sufficient number of scales to cover a range of sizes of the radiological signs;

performing a convolution of each back-projected projection with the differential filter, for each scale value; and reconstructing the digital volume of the body from the projections back-projected and filtered for each scale value.

23. A method according to claim 17, wherein the preliminary determining of the contrast threshold comprises the following steps:

preliminarily defining a first threshold that depends on the local background intensity of the digital volume and the value of scale of the filter;

providing this background intensity at every point by the convolution of each slice of the digital volume with the coefficients of the positive part of the wavelet filter or else by the convolution of each projection with the coefficients of the positive part of the wavelet filter, then by reconstruction;

preliminarily defining a second threshold that depends on a local noise level present in the digital volume; and making a combination of the first and second thresholds in order to obtain the contrast threshold.

24. A method according to claim 17, wherein the step of eliminating structures forming false positives comprises the following steps:

determining a set of filtered digital volumes for which the contrast of the structures is amplified;

pre-defining a structure contrast threshold which depends on the local noise level;

creating a binary volume in which all the voxels whose contrast is greater than the structure contrast threshold are set at 1 and all the others are set at 0;

determining particles of potential structures formed by a set of connected voxels;

measuring the elongation of each particle of potential structures;

defining a minimum threshold of elongation; and when the elongation of the particle is greater than the minimum elongation threshold, then assigning the voxels of the particle a non-radiological-sign voxel attribute.

25. A method according to claim 24, wherein the step of obtaining the filtered digital volumes comprises:

determining directional filters to be applied to the digital volume; and convolving each slice with the directional filters.

26. A method according to claim 25, wherein the directional filters are b-spline type wavelet filters having different scales and orientations.

27. A method according to claim 24, wherein the step of obtaining the filtered digital volumes comprises:

determining directional filters to be applied to each projection;

convolving each projection with the directional filters; and reconstructing the filtered digital volume from filtered projections for each directional filter.

28. A method according to claim 24, wherein the step of obtaining the filtered digital volumes comprises one of:

considering the result of the convolution of the volume by the linear differential filters, for each scale value;

or else, for each scale value, considering the reconstructed volume on the basis of the projections convoluted by the linear differential filters.

29. A method according to claim 17, wherein the step of enhancing of the voxels in the digital presentation volume comprises the following steps:

creating a binary image in which all the voxels having a radiological sign voxel attribute are set at 1 and all the others are set at 0;

determining particles formed by a set of connected voxels; and amplifying the difference between the intensity of each voxel of the particle, as well as its immediate environment, and the mean intensity of the voxels surrounding the particle.

30. A method according to claim 29, further comprising:

determining the cluster of particles comprising a minimum number of particles;

amplifying the difference between the intensity of each voxel of the particle, as well that of as its immediate environment, and the mean intensity of the voxels surrounding the particle, as a function of the number of particles present in the cluster; and one of placing a marker in the vicinity of the center of gravity of the cluster or plotting a contour demarcating the cluster.

31. An X-ray device for implementing said radiology image-processing method for a detection of radiological signs according to claim 17.

* * * * *

UNITED STATES PATENT AND TRADEMARK OFFICE
CERTIFICATE OF CORRECTION

| | | |
|---|---|---|
| PATENT NO. | : 7,853,064 B2 | Page 1 of 1 |
| APPLICATION NO. | : 11/756471 | |
| DATED | : December 14, 2010 | |
| INVENTOR(S) | : Sylvain Bernard et al. | |

It is certified that error appears in the above-identified patent and that said Letters Patent is hereby corrected as shown below:

In Column 2, Lines 60-61, delete "FIG. 3 illustrates means implementing the method of the invention.".

In Column 6, Line 22, delete "Ib" and insert -- $I_b$ --, therefor.

In Column 13, Line 36, in Claim 1, delete "wherein:".

In Column 13, Line 55, in Claim 2, delete "signal;" and insert -- signals; --, therefor.

In Column 14, Line 2, in Claim 4, delete "analyzed," and insert -- analyzed; --, therefor.

In Column 15, Line 14, in Claim 11, delete "b-spline" and insert -- β-spline --, therefor.

In Column 15, Line 26, in Claim 13, delete "value;" and insert -- value; and --, therefor.

In Column 15, line 27, in Claim 13, delete "or else, for each scale value, considering" and insert -- considering for each scale value, --, therefor.

In Column 15, Line 63, in Claim 17, delete "wherein:".

In Column 16, Line 20, in Claim 19, delete "analyzed," and insert -- analyzed; --, therefor.

In Column 17, Line 33, in Claim 26, delete "b-spline" and insert -- β-spline --, therefor.

Signed and Sealed this
Twenty-first Day of February, 2012

David J. Kappos
*Director of the United States Patent and Trademark Office*